April 26, 1955 V. B. McCLURE 2,706,819
BARRIER FOR AN AUTOMOBILE SEAT
Filed Dec. 1, 1952

Inventor
V. B. McClure
Arthur H. Sturges
Attorney

United States Patent Office 2,706,819
Patented Apr. 26, 1955

2,706,819

BARRIER FOR AN AUTOMOBILE SEAT

Victor B. McClure, Hebron, Nebr.

Application December 1, 1952, Serial No. 323,480

1 Claim. (Cl. 5—94)

The instant invention relates to passenger automobiles and more particularly to the rear seats thereof.

It is an object of the invention to provide a barrier disposed across the interior of an automobile body and in approximate vertical alignment with the forward edge of the rear seat thereof, whereby the latter can be employed as a bed for transporting an infant thereon and in a manner whereby the infant is prevented from rolling off the seat or bed from shocks and jars incidental to road traveling movements of the vehicle.

Another object of the invention is to provide a device which is flexible, whereby it may be compactly stored when not in use, and which may be readily attached in a position of use to the interior surfaces of an automobile body.

An important object of the invention is to provide a device which prevents the oppositely disposed doors of a passenger automobile from swinging open during road traveling movements of the vehicle for preventing a child from falling through a doorway of the body of an automobile, and a factor of safety is provided.

Other objects and advantages of the invention will be understood from the following detailed description thereof.

Figure 1:
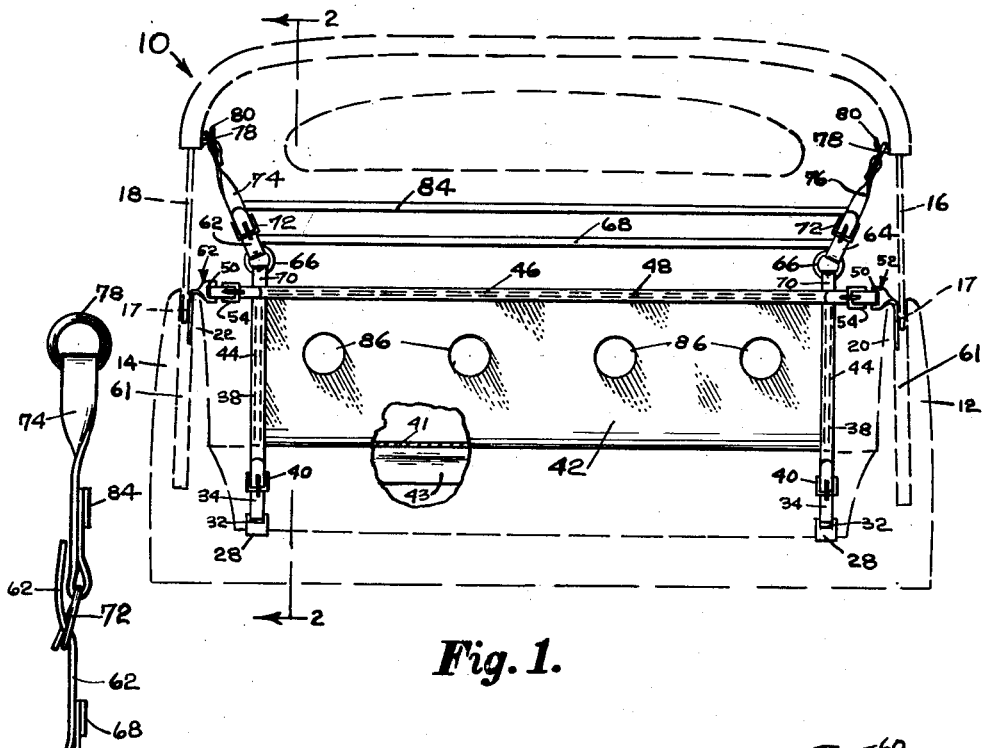
Figure 1 is a front elevation of the new device applied in a position of use to the interior surfaces of a passenger automobile body, the latter being represented primarily by means of broken lines, certain portions of said device being broken away.

Referring now to the drawings for a more particular description in which like numerals of reference designate like or corresponding parts, 10 indicates generally an automobile body. The said body is of conventional type and includes oppositely disposed doors 12 and 14, which are mounted on hinges for outward swinging movements in a conventional manner.

The doors, 12 and 14, include glass window panes indicated at 16 and 18 respectively. The said panes of glass are slideably disposed in their frames, carried by the doors in a well-known manner.

It is well-known that there is a space indicated at 17 between the inner surfaces of said windows, 16 and 18, and the adjacent surfaces of the horizontally disposed rails, 20 and 22 of the window frames carried by the doors 12 and 14 respectively.

The space 17 usually is approximately one-fourth of an inch wide and this fact is utilized by the instant construction.

Figure 2:
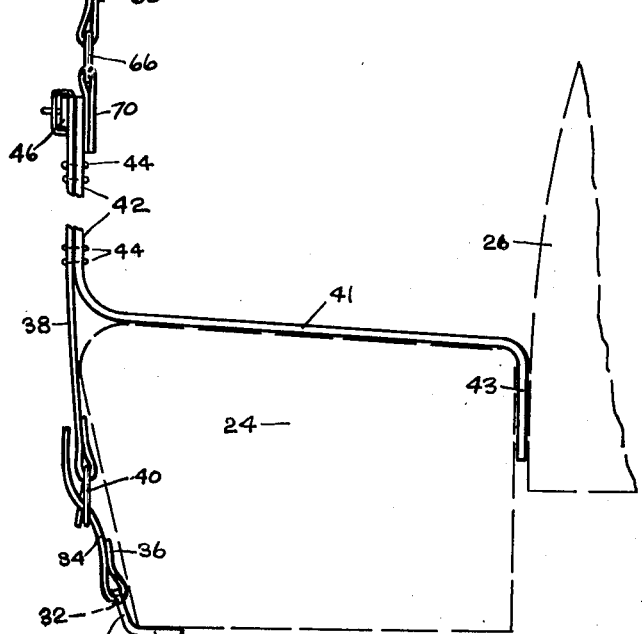
Figure 2 is a vertical section of a preferred embodiment of the invention, the view being taken substantially on line 2—2 of Figure 1, certain portions of the rear seat of an automobile being represented by means of broken lines.

The rear seat of the vehicle is indicated at 24 and the vertically disposed back-cushion for said seat at 26 as best shown in Figure 2.

The new device includes two oppositely disposed like hooks 28 which, as shown in Figure 2, are approximately L-shaped in edge view. During use, the arms 30 of the hooks are engaged under and with the bottom forward edge of the seat 24. The arms 30 of the hooks may be of any desired length.

As best shown in Figure 1 each of the hooks 28 is provided with an elongated aperture 32 for the reception therethrough of end portions of straps 34 respectively.

As best shown in Figure 2, the end portion 36 of the strap 34, after being passed through the aperture 32 of the hook 28, is folded upon itself and attached to the main body portion of the strap by any suitable means such as rivets or stitching not shown, whereby the hooks are secured to their respective straps 34.

The straps 34 are each adjustably attached to like straps 38 by means of buckles 40 respectively, since the distance between the lower forward edge of the seat 24 and the later mentioned side-wall-hooks of the automobile 10 varies with respect to different models of automobiles.

In operative effect the straps 34 and 38 are integral.

A portion of each strap 38 is attached to the barrier sheet 42 at the side edges of said barrier sheet respectively, preferably by means of stitching indicated at 44.

Similarly, a transversely disposed band 46 is attached to the upper edge of the barrier sheet 42 by means of stitching 48.

The ends of the band 46 extend beyond the side edges of the barrier respectively, being reeved through the elongated openings 50 respectively of the detents 52. One of the latter is best shown in Figures 3 and 4.

Adjacent each end of the band 46 the latter is provided with two further buckles employed, said buckles being indicated at 54, whereby the over-all length of the band 46 may be varied complemental to the distance between the doors 12 and 14, since it is desirable or essential that, during use, the band 46 be maintained taut.

Figure 3:
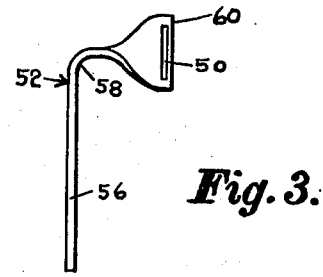
Figure 3 is a side elevation of a strap-attaching means employed.
Figure 4:
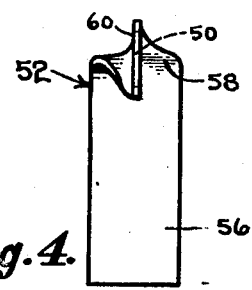
Figure 4 is a front elevation of the device depicted in Figure 3.

Referring to Figure 3 a detent 52 includes a shank portion 56 which in use is normally disposed in a vertical direction. The portion 58 of the shank 56 is disposed at a right angle with respect to said shank. The portion 58, as best shown by Figure 4, is twisted, during manufacture of the detent, to an angle of 90 degrees with respect to the portion 58, whereby the terminal edge 60 of the portion 58 is disposed in parallelism with the shank portion 56 and is also disposed vertically during use.

Adjacent to the edge 60 the elongated opening 50 is provided. The transverse thickness of the shank 56 is slightly less than the heretofore mentioned space 17 between a side surface of the window glass 16 and the confronting wall of the rail 20 of the window frame of the door 12, whereby the shank 56 may be readily inserted in or removed from said space 17. Since the portion 58 of the detent is disposed at a right angle to the shank portion 56 thereof the portion 58 prevents the detent from falling downwardly into the slot 61 of the door 12 which receives the window glass 16.

The oppositely disposed like detent may be readily attached to the door 14 in the same manner whereupon the buckles 54 of the band 46 are manipulated for making the band taut. The band, together with the said detents may be readily detached from the doors by causing the detents to be moved upwardly subsequent to a detachment of the hooks 28 from the bottom forward edge of the seat 24.

It will be seen that at the time the band 46 is placed in an operative position, that the doors 12 and 14 are maintained in a closed position irrespective of whether or not the latches and handles of the doors are in a closed position, since the doors are attached together and an outward swinging movement of the doors prevented.

The new device further includes further oppositely disposed straps 62 and 64 the lower ends of which respectively extend through like rings 66. The straps 62 and 64 are folded upon themselves as best shown in Figure 2 and their terminal ends sewn to their main body portions, a transversely disposed upper belt 68 being sewn to said straps 62 and 64. The straps 62 and 64 are, in effect, portions of the straps 38.

The rings 66 are attached to the barrier 42 by means of a flexible loop 70 the lower ends of which are secured to the barrier 42 by any suitable means such as stitching. The upper end of the loop 70 extends through the ring 66.

The straps 62 and 64 are each provided with like buckles indicated at 72. The buckles are attached to upper straps 74 and 76 respectively.

The upper ends of the straps 74 and 76 are provided with further rings as indicated at 78.

The rings 78 engage the hooks 80 which are secured to the side walls of the vehicle respectively as shown. The hooks 80 are usually installed by the manufacturer of the vehicle at the factory of said manufacturer. The conventional use of said hooks 80 is to suspend therefrom coat-hangers and the like.

In instances where the body of a passenger automobile is not provided with the hooks 80, the latter are installed by the purchaser of a specimen of the instant invention, by an employment of screws, preferably the special screws which are best adapted for use in connection with sheet metal.

The upper straps 74 and 76 are in operative effect parts of the straps 62 and 64 respectively.

The new device further includes an uppermost belt 84 employed. The ends of the belt 84 are respectively attached to the straps 74 and 76.

As best shown in Figure 1, the flexible barrier is provided with a row of transversely disposed apertures 86 preferably employed for purposes later described.

Referring to Figure 2, the vertically disposed barrier 42 is provided with a portion 41 formed integral therewith, which, during use, is disposed upon the top of the seat 24. The portion 41 is provided with an integral flap 43 which in use is disposed between the rear wall of the seat 24 and the front wall of the back cushion 26. The flap 43 extends downwardly between the said front and back walls of said cushions tucked into place by the fingers of the operator. It will be understood that since the said cushions are resilient and snugly abutted against each other, that the flap 43 becomes securely positioned while, at the same time, the flap may be withdrawn for storage purposes.

In operation and assuming that the new device is installed with respect to the interior of a passenger automobile body as above described, it will be seen that an infant may be placed upon the extended portion 41 of the barrier 42 and in a manner whereby the said infant is prevented from rolling off of the seat 24 during traveling movements of the vehicle during which time, the driver of the vehicle or other passenger may observe the infant through the apertures 86 for ascertaining the condition of the infant as the occasion may require. Should the infant stand upon the portion 41, while supported by the seat 24, it will be seen that the infant is prevented from falling over the upper edge of the barrier 42, by means of the transversely disposed belt 84.

Among other advantages of the invention, that it is believed pertinent to mention that since the doors 12 and 14 are prevented from swinging outwardly by the detents 52 and the band 46 even at times when a latch on either one of said doors is released that a child occupant is thereby prevented from falling outwardly through a doorway of the vehicle during traveling movements of the automobile, the said construction providing a factor of safety in the event that the child should climb over the top of the barrier and release a latch of one of the doors as often has happened.

From the foregoing description it is thought to be obvious that an automobile seat barrier constructed in accordance with my invention, is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In a motor vehicle rear seat barrier, the combination which comprises spaced vertically disposed straps adapted to be positioned substantially at the ends of a rear seat of a vehicle, buckles on the lower ends of said straps, other straps having hooks on the lower ends adjustably secured in said buckles, said hooks having horizontally disposed arms adapted to be secured under the forward edge of a seat, rings on the upper ends of the vertically disposed straps, upper obliquely disposed straps held in the rings on the upper ends of the vertically disposed straps, said obliquely disposed straps having rings in the extended ends and buckles in the intermediate parts, spaced horizontally disposed belts extended across the barrier and connecting said upper straps, a transversely disposed band having buckles on extended ends connecting the upper ends of said vertically disposed straps, detents positioned at the ends of the band and having openings through which the loops on the ends of the band extend, said detents having shanks adapted to be inserted between the glass of a motor vehicle door and the frame of the door, and a sheet of material positioned with the upper edge secured to said band and upper portions of the sides secured to said vertically disposed straps, the lower portion of said sheet of material adapted to extend across the rear seat of a vehicle with the extended edge positioned between the rear edge and back of the seat.

References Cited in the file of this patent

UNITED STATES PATENTS

| Number | Name | Date |
|---|---|---|
| 416,102 | Hannahs | Nov 26, 1889 |
| 1,062,127 | Smith | May 20, 1913 |
| 1,959,974 | Westgate | May 22, 1934 |
| 2,048,955 | Showalter | July 28, 1936 |
| 2,564,480 | Jones | Aug. 14, 1951 |
| 2,595,329 | Brooks | May 6, 1952 |
| 2,645,789 | Wisner | July 21, 1953 |

OTHER REFERENCES

Popular Mechanics, article by Willis, pg. 174, January 1949.